Figure 1:
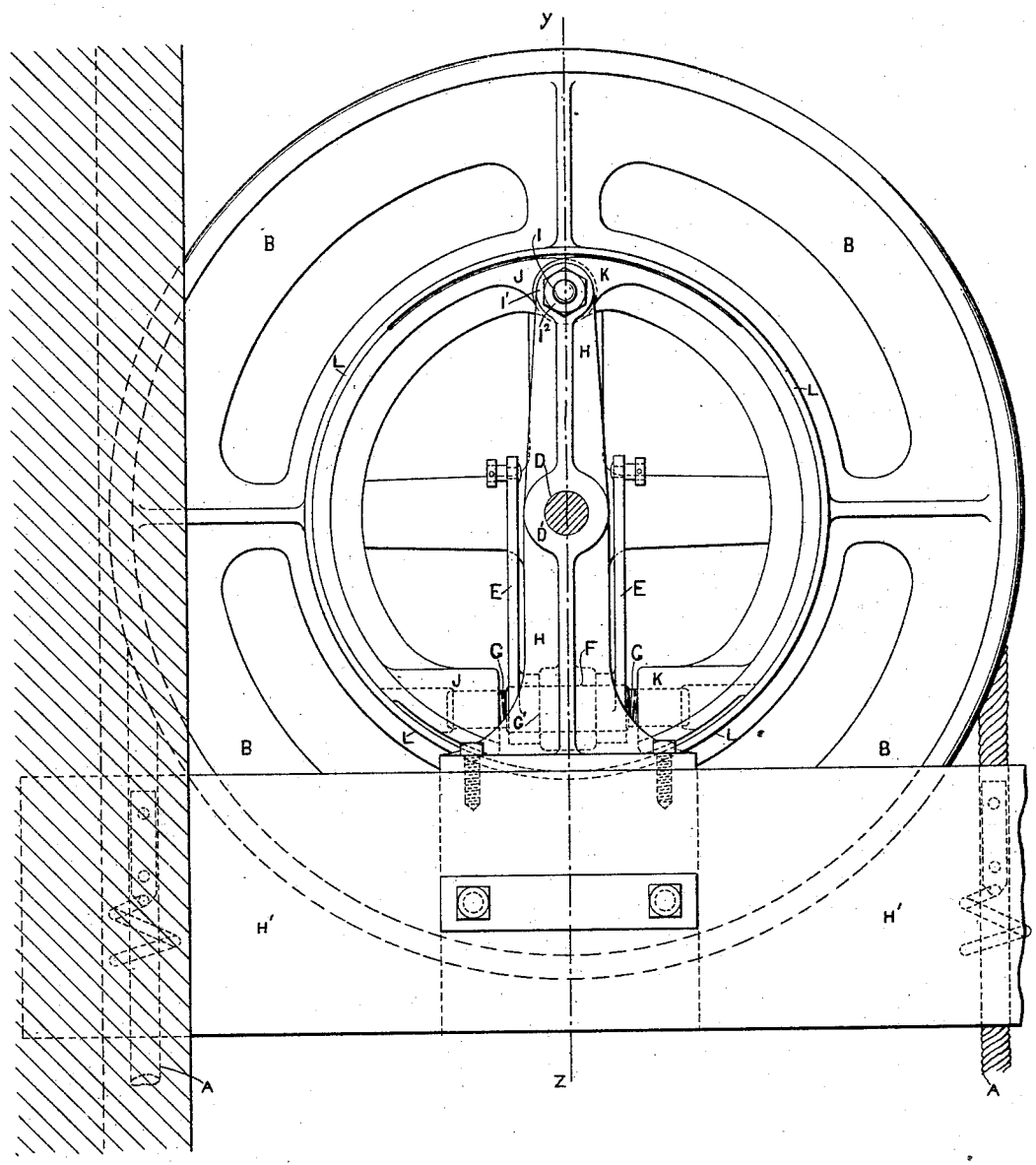

(No Model.)
2 Sheets—Sheet 1.

R. A. BEAVER.
BRAKE APPARATUS FOR HOISTS.

No. 353,282. Patented Nov. 30, 1886.

Witnesses
James D. DuHamel
Walter A. Dodge

Inventor
Robert Atwood Beaver,
by Dodge & Son, Attys.

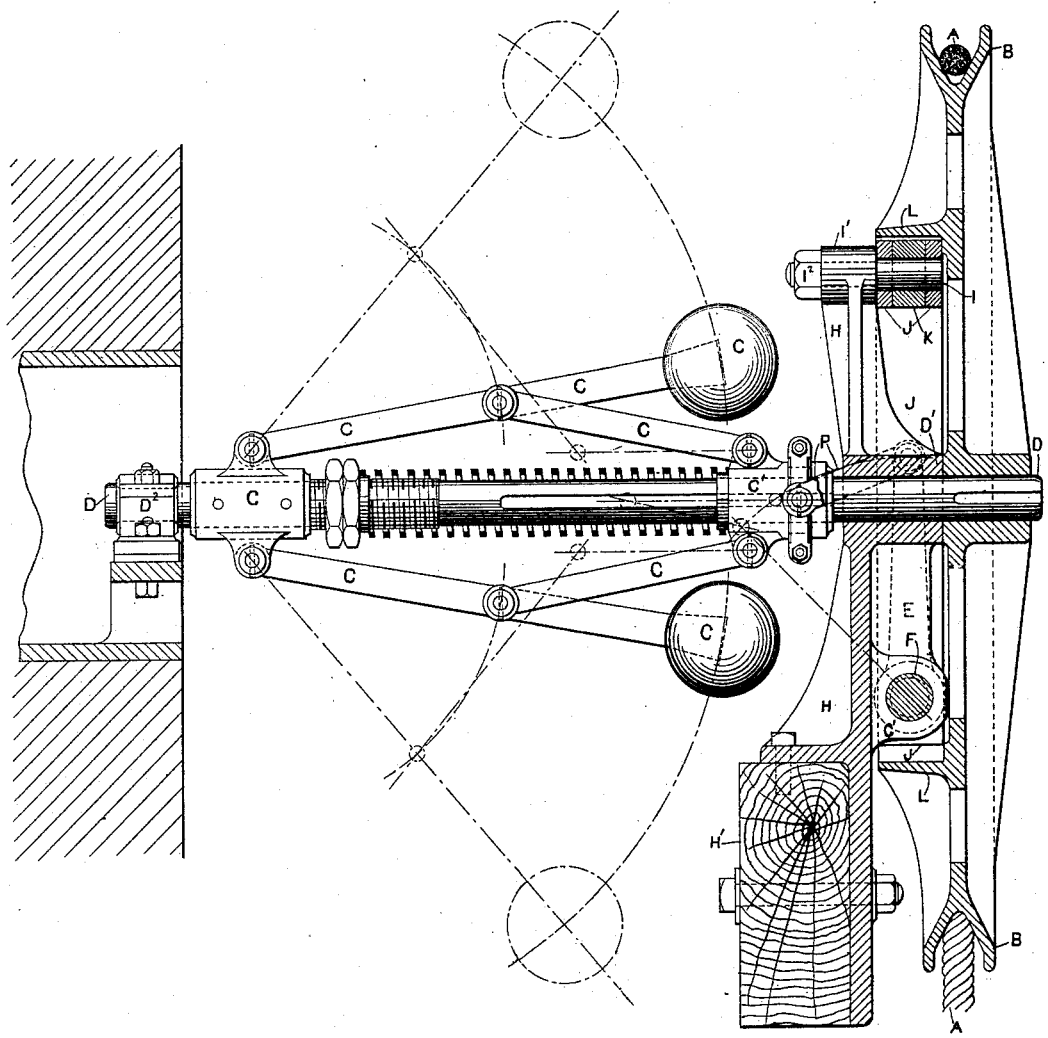

UNITED STATES PATENT OFFICE.

ROBERT ATWOOD BEAVER, OF LIVERPOOL, COUNTY OF LANCASTER, ENGLAND.

BRAKE APPARATUS FOR HOISTS.

SPECIFICATION forming part of Letters Patent No. 353,282, dated November 30, 1886.

Application filed February 4, 1886. Serial No. 190,856. (No model.) Patented in England August 13, 1885, No. 9,653.

*To all whom it may concern:*

Be it known that I, ROBERT ATWOOD BEAVER, a subject of the Queen of Great Britain, residing at Liverpool, in the county of Lancaster, in the Kingdom of England, have invented certain new and useful Improvements in Brake Apparatus for Hoists, (for which application was made in England for Letters Patent, No. 9,653, dated August 13, 1885,) of which the following is a specification.

This invention has for its object a safety apparatus which, applied to the shaft carrying the drum or pulley around which the cage balance rope or chain passes, will regulate and control the speed of descent or ascent in case of an accident to the hoisting machinery.

The invention consists in placing a brake on the shaft, controlled by a governor on or connected with the said shaft, so that if the shaft begins to revolve too rapidly the governor-balls will fly out, and by means of links put the brake on.

Referring to the drawings, Figure 1 is an end view, and Fig. 2 a section through $yz$ of Fig. 1.

In these, A is the balance-rope carrying balance-weight of hoist and passing over V-pulley B; B, pulley keyed to shaft D and carrying balance-rope A; C C C', governor, of any ordinary description, on or synchronously connected with shaft D in such manner that the speeds of revolution of shaft D and the governor C must always have one uniform ratio the one to the other.

In the drawings I have shown the governor C as keyed to and rotating at the same angular speed as shaft D. Shaft D is supported in bearings D' D², fixed in brackets on walls or stationary beams. To the sliding collar C' of the governor the links P P are pivoted. These links are linked at their other ends to arms E E. These arms are keyed to a spindle, F, having right and left hand screwed ends G and a central bearing in bracket G'.

H is a bracket fixed to beam H', and carrying the spindle F by means of bracket G', and shaft D by means of bearing D', and spindle I, hereinafter described, by means of bearing I' and nut I². Spindle I is firmly fixed to bearing I' by being slightly larger in diameter than the bearing on one side and being fastened by nut I² at the other. The screwed ends of spindle G screw similarly into screwed holes in two brake-blocks, J K.

L is an annular flange on wheel B, with cylindrical turned interior surface. Against this the brake-blocks J K are pressed by the screw G, arms E E, and links P, whenever the governor, going too quick, draws back said links sufficient.

The mode of action in case of fracture of the hoisting-rope or its apparatus, neither of which is shown in the drawings, is as follows: The weight in the hoist causes it to descend with rapidly-increasing speed. The speed of the balance-rope, and therefore the wheel B and shaft D, is consequently similarly increased, and the governor attached to or worked from shaft D is brought into action. It in turn draws back links P and arms E, and thus revolving shaft G, with its right and left hand screwed ends in the brake-blocks, forces the brake-blocks against flange L, and thus puts the brake on wheels B, thus preventing the latter from turning at a quicker speed than that allowed by the governor. By this means the hoist is allowed to descend at little greater speed than its normal one.

I am aware that it has been proposed to apply to the winding-drum of a fire-escape a governor-brake adapted and arranged to bear upon a fixed brake-drum when the speed of the winding-drum exceeds a predetermined rate, and to this construction I lay no claim.

I claim as my invention—

1. In a brake mechanism for hoists, the combination, with a fixed frame-work, of a shaft journaled therein, a wheel rigidly secured upon the shaft and provided with a brake-surface, a brake mechanism mounted in the stationary frame-work, and a governor applied directly to the shaft and connected with the brake mechanism, as and for the purposes set forth.

2. In a hoist, in combination with a shaft, D, a governor, C, secured thereon, a wheel, B, also secured upon said shaft and provided with an annular brake-flange, L, a right-and-left screw, G, journaled in the frame, an arm, E, rigidly secured to said screw, a link, P, connecting the arm and the governor, and brake-shoes J K, pivoted at one end and connected with the screw at their other ends, substantially as shown, whereby when the shaft exceeds a predetermined speed the brake-shoes are moved upon their pivot into contact with the flange.

3. In a hoist, in combination with a bracket, H, a shaft, D, journaled therein and provided with a wheel, B, flange L thereon, brake-blocks J K, pivoted at their upper ends to the bracket I, screw G, connected to said brake-blocks at their lower ends, arm E, secured to screw G, and link P, connected to the arm E and with the governor, substantially as set forth.

4. The combination of the arms E, screwed spindle G, and suspended brake-blocks J K with the balance rope, chain, or pulley B of a hoist, for the purpose described.

5. The bracket H, having lug for carrying brake-spindle F, bearing D' for main shaft, and suspension-spindle I, carrying hinged brake-blocks J K, substantially as described.

In testimony whereof I have signed my name to this specification in the presence of two subscribing witnesses.

R. ATWOOD BEAVER.

Witnesses:
W. P. THOMPSON,
I. OWDEN O'BRIEN.